(12) United States Patent
Oikawa et al.

(10) Patent No.: US 7,183,013 B2
(45) Date of Patent: Feb. 27, 2007

(54) MAGNETIC RECORDING MEDIUM AND MANUFACTURING METHOD THEREOF

(75) Inventors: Tadaaki Oikawa, Nagano (JP); Takahiro Shimizu, Nagano (JP); Hiroyuki Uwazumi, Nagano (JP); Naoki Takizawa, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 300 days.

(21) Appl. No.: 10/764,813

(22) Filed: Jan. 26, 2004

(65) Prior Publication Data
US 2004/0229084 A1    Nov. 18, 2004

(30) Foreign Application Priority Data
Jan. 24, 2003 (JP) ............................. 2003-016580

(51) Int. Cl.
*G11B 5/66* (2006.01)
*G11B 5/70* (2006.01)

(52) U.S. Cl. .................................... 428/831.2; 427/131
(58) Field of Classification Search ............... 428/831, 428/831.2
See application file for complete search history.

(56) References Cited

U.S. PATENT DOCUMENTS

| | | | |
|---|---|---|---|
| 5,679,473 A | 10/1997 | Murayama et al. | 428/694 T |
| 6,110,582 A | 8/2000 | Wu et al. | |
| 6,162,526 A | 12/2000 | Kobayashi | |
| 6,221,481 B1 | 4/2001 | Wu et al. | |
| 6,379,775 B1 | 4/2002 | Kobayashi | |
| 6,403,240 B1 * | 6/2002 | Kanbe et al. | 428/826 |
| 6,936,352 B2 * | 8/2005 | Ohsawa et al. | 428/611 |

FOREIGN PATENT DOCUMENTS

| | | |
|---|---|---|
| JP | 8-255342 A | 10/1996 |
| JP | 2000-276729 A | 10/2000 |
| JP | 2001-101651 A | 4/2001 |
| JP | 2002-15417 A | 1/2002 |

OTHER PUBLICATIONS

Machine translation of JP 2002-015417, Uwazumi et al., Jan. 18, 2002.*
Relevant portion of Search Report (6 pages) and Written Opinion (9 pages) dated Oct. 14, 2005, issued in SG 200307529-8 by the Intellectual Property Office of Singapore.

* cited by examiner

*Primary Examiner*—Holly Rickman
(74) *Attorney, Agent, or Firm*—Rossi, Kimms & McDowell, LLP

(57) ABSTRACT

A nonmagnetic foundation layer is made to have a body-centered cubic crystal structure with a preferred crystal orientation plane being the bcc (110) plane. A nonmagnetic intermediate layer, provided between the foundation layer and a granular magnetic layer, has a hexagonal close-packed structure with the hcp (100) plane or the hcp (200) plane being the preferred orientation plane. Furthermore, the crystal lattice misfit amount between the nonmagnetic intermediate layer 3 and the granular magnetic layer is made to be not more than 10% for each of an a-axis and a c-axis. As a result, epitaxial growth of ferromagnetic crystals in the granular magnetic layer, which has an hcp structure, is promoted, and hence the crystallinity of the magnetic layer is increased, and thus it becomes possible to simultaneously realize an increase in coercivity and a reduction in noise. Depositing the layers on an unheated substrate yields reduces manufacturing costs.

28 Claims, 2 Drawing Sheets

MAGNETIC RECORDING MEDIUM AND MANUFACTURING METHOD THEREOF

BACKGROUND OF THE INVENTION

The present invention relates to a magnetic recording medium and a manufacturing method thereof, and more specifically to a magnetic recording medium and a manufacturing method thereof, according to which an increase in coercivity and a reduction in noise are simultaneously realized, and moreover the manufacturing cost is reduced.

Various magnetic layer compositions and structures, nonmagnetic foundation layer materials and so on have been studied and proposed for magnetic recording media, for which high recording density and low noise are demanded. In particular, in recent years, there have many proposals for 'granular magnetic layers', which are magnetic layers having a structure in which magnetic crystal grains are surrounded by a nonmagnetic nonmetallic substance such as an oxide or a nitride.

For example, Japanese Patent Application Laid-open No. 8-255342, it is proposed to form a nonmagnetic film, a ferromagnetic film and a nonmagnetic film in this order and then to carry out heating treatment, thus forming a granular magnetic layer (recording layer) in which ferromagnetic crystal grains are dispersed in a nonmagnetic film, whereby noise can be reduced. An oxide or nitride of silicon or the like is used for the nonmagnetic films in this case.

Moreover, U.S. Pat. No. 5,679,473 describes depositing a recording layer by RF sputtering using a CoNiPt target to which an oxide such as $SiO_2$ has been added in advance, whereby a granular magnetic layer having a structure in which magnetic crystal grains are surrounded by a nonmagnetic oxide and are separated from one another can be formed, and hence high coercivity (Hc) and low noise can be realized.

Moreover, Japanese Patent Application Laid-open No. 2001-101651, there is disclosed a granular magnetic layer that is constituted from an alloy having Co as a principal component thereof and having an hcp structure and 3 to 50 mol % of an oxide or nitride, and for which an axis of easy magnetization is oriented in a direction approximately parallel to the substrate surface, and it is stated that an increase in coercivity and a reduction in noise are possible with this granular magnetic layer.

Furthermore, Japanese Patent Application Laid-open No. 2000-276729, an example is reported in which a recording layer is constituted from a granular magnetic layer in which a plurality of ferromagnetic crystal grains comprising an alloy having a composition such as $Co_{80}Pt_{15}Cr_5$ are arranged in an $SiO_2$ matrix, whereby a magnetic recording medium having good overwrite properties can be realized.

With such granular magnetic layers, it is thought that a nonmagnetic nonmetallic grain boundary phase physically (spatially) separates the magnetic grains from one another, and hence the magnetic interaction between the magnetic grains is reduced, and thus the formation of zigzag magnetic domain walls occurring at recording bit transitional regions is suppressed, whereby low noise can be obtained.

With CoCr-type metallic magnetic films that have been used in the past, the deposition is carried out at high temperature, and hence the Cr precipitates out from the Co-based magnetic grains and becomes segregated at the grain boundaries, which reduces the magnetic interaction between the magnetic grains; however, in the case of a granular magnetic layer, a nonmagnetic nonmetallic substance is used as a grain boundary phase, and hence segregation occurs more easily than with the Cr in a conventional CoCr-type metallic magnetic film, and thus isolation of the magnetic grains from one another can be promoted relatively easily. Moreover, in a conventional CoCr-type metallic magnetic film, to secure sufficient Cr segregation, it is essential to set the substrate temperature to at least 200° C. during the film deposition, whereas in the case of a granular magnetic layer, there is an advantage that the nonmagnetic nonmetallic substance can be made to segregate at the grain boundaries even in the case that the magnetic layer is deposited without heating the substrate.

However, with magnetic recording media having a granular magnetic layer, there is a problem in that to realize the desired magnetic properties (in particular high coercivity Hc), it becomes necessary to add a relatively large amount of Pt, which is expensive, to the Co alloy. For example, with the magnetic recording medium described in above-mentioned U.S. Pat. No. 5,679,473, to realize an Hc of approximately 2400 Oe, a large amount of Pt of 11 at % is necessary, whereas to realize approximately the same Hc with a conventional CoCr-type metallic magnetic film, adding at most 5 at % of Pt is sufficient. As the density of magnetic recording has increased in recent years, a very high Hc of 3000 Oe or more has come to be demanded of magnetic recording media, and in this situation there is a problem that with granular magnetic layers, for which a large amount of expensive Pt is required to increase the Hc, the manufacturing cost rises.

Moreover, as the recording density is increased, further reductions in medium noise are demanded, and hence there is an increasing need to finely control the microstructure of granular magnetic layers, for example the magnetic crystal grain size and the segregation structure. For example, Japanese Patent Application Laid-Open No. 2002-015417, it is disclosed that by forming a nonmagnetic intermediate layer of a nonmagnetic metal or alloy having an hcp crystal structure between a granular magnetic layer and a nonmagnetic foundation layer, it is possible to realize high Hc and low medium noise; however, to further reduce noise, crystal design on an atomic level, i.e. control of the state of orientation and the misfit amount of the crystal lattice between the respective layers, is considered to be necessary.

In view of the problems described above, it would be desirable to provide a magnetic recording medium and a manufacturing method thereof, according to which an increase in coercivity and a reduction in noise are simultaneously realized, and moreover the manufacturing cost is reduced.

SUMMARY OF THE INVENTION

The present invention provides a magnetic recording medium and a manufacturing method thereof, according to which an increase in coercivity and a reduction in noise are simultaneously realized, and moreover the manufacturing cost is reduced.

Specifically, in the case of a magnetic recording medium in which at least a nonmagnetic foundation layer, a granular magnetic layer, a protective layer and a liquid lubricant layer are formed in this order on a nonmagnetic substrate, the magnetic recording medium is characterized in that the foundation layer has a body-centered cubic crystal structure with a preferred crystal orientation plane being a bcc (110) plane, and is characterized by having, between the foundation layer and the granular magnetic layer, a nonmagnetic intermediate layer that has a hexagonal close-packed structure with an hcp (100) plane or an hcp (200) plane being a preferred orientation plane.

Moreover, the magnetic recording medium is characterized in that the nonmagnetic intermediate layer is made of an alloy containing at least Ge and containing at least one selected from the group consisting of Fe and Mn.

Moreover, the magnetic recording medium is characterized in that the nonmagnetic intermediate layer is made of an alloy containing at least Co and containing at least one selected from the group consisting of W and Mo.

Moreover, the magnetic recording medium is characterized in that the nonmagnetic intermediate layer is made of an alloy containing at least Ti and containing at least one selected from the group consisting of Pd, Ga and Al.

Moreover, the magnetic recording medium is characterized in that the nonmagnetic intermediate layer is made of an alloy containing at least Ni and containing at least one selected from the group consisting of Zr, Sn and In.

Moreover, the magnetic recording medium is characterized in that the nonmagnetic intermediate layer is made of an alloy of Fe and Sn.

Moreover, the magnetic recording medium is characterized in that the nonmagnetic intermediate layer is made of a compound containing at least one selected from the group consisting of carbides and nitrides of Co, Ni and Fe.

Moreover, the magnetic recording medium is characterized in that the nonmagnetic intermediate layer is made of an alloy having an $Ni_3Sn$-type or AuCd-type regular lattice structure.

Moreover, the magnetic recording medium is characterized in that a crystal lattice misfit amount between the nonmagnetic intermediate layer and the granular magnetic layer is not more than 10% for each of an a-axis and a c-axis.

Moreover, the magnetic recording medium is characterized in that nonmagnetic grain boundaries in the granular magnetic layer comprise at least one oxide of at least one element selected from the group consisting of Cr, Co, Si, Al, Ti, Ta, Hf and Zr.

Moreover, the magnetic recording medium is characterized in that ferromagnetic crystals in the granular magnetic layer are made of a CoPt alloy and the CoPt alloy has at least one element selected from the group consisting of Cr, Ni and Ta added thereto.

Moreover, the magnetic recording medium is characterized in that the foundation layer is made of any material selected from the group of metals consisting of Ta, Cr, W, Mo and V, the group of Cr alloys consisting of CrMo, CrTi, CrV and CrW, and the group of Ti alloys consisting of TiW, TiMo, TiCr and TiV each containing 10 to 60 at % of Ti.

Moreover, the magnetic recording medium is characterized in that the nonmagnetic substrate comprises a plastic resin.

Furthermore, the method is characterized by carrying out a film deposition process without heating the nonmagnetic substrate in advance.

BRIEF DESCRIPTION OF THE DRAWINGS

The reference will now be described with reference to certain preferred embodiments thereof and the accompanying drawings, wherein.

DETAILED DESCRIPTION OF THE PREFERRED EMBODIMENTS

The present inventors carried out assiduous studies to increase coercivity, reduce noise and reduce cost for granular magnetic layers, and as a result discovered that by providing, between a granular magnetic layer and a nonmagnetic foundation layer, a nonmagnetic intermediate layer comprising an alloy having a hexagonal close-packed (hcp) crystal structure, coercivity can be increased and noise can be reduced, without increasing the amount added of Pt, which is expensive. A similar idea is also disclosed in above-referenced Japanese Patent Application Laid-Open No. 2002-015417, but in the present invention the nonmagnetic intermediate layer is not constituted from an alloy containing an expensive precious metal such as Ru or Ir, but rather the nonmagnetic intermediate layer is constituted from an alloy containing a relatively inexpensive metal such as Ge, Co, Ti or Ni, and moreover crystal design of the nonmagnetic intermediate layer has been carried out while considering the state of orientation and the misfit amount of the crystal lattice between the nonmagnetic intermediate layer and the magnetic layer.

Specific alloy compositions for the nonmagnetic intermediate layer will be described later; however, the nonmagnetic foundation layer in the magnetic recording medium of the present invention is preferentially orientated in the bcc (110) plane of a body-centered cubic (bcc) structure, and the nonmagnetic intermediate layer provided thereon is easily oriented in the hcp (100) plane or the hcp (200) plane. As a result, epitaxial growth of the granular magnetic layer on the nonmagnetic intermediate layer is promoted, and hcp (100) plane in-plane orientation becomes easy.

Figure 1:
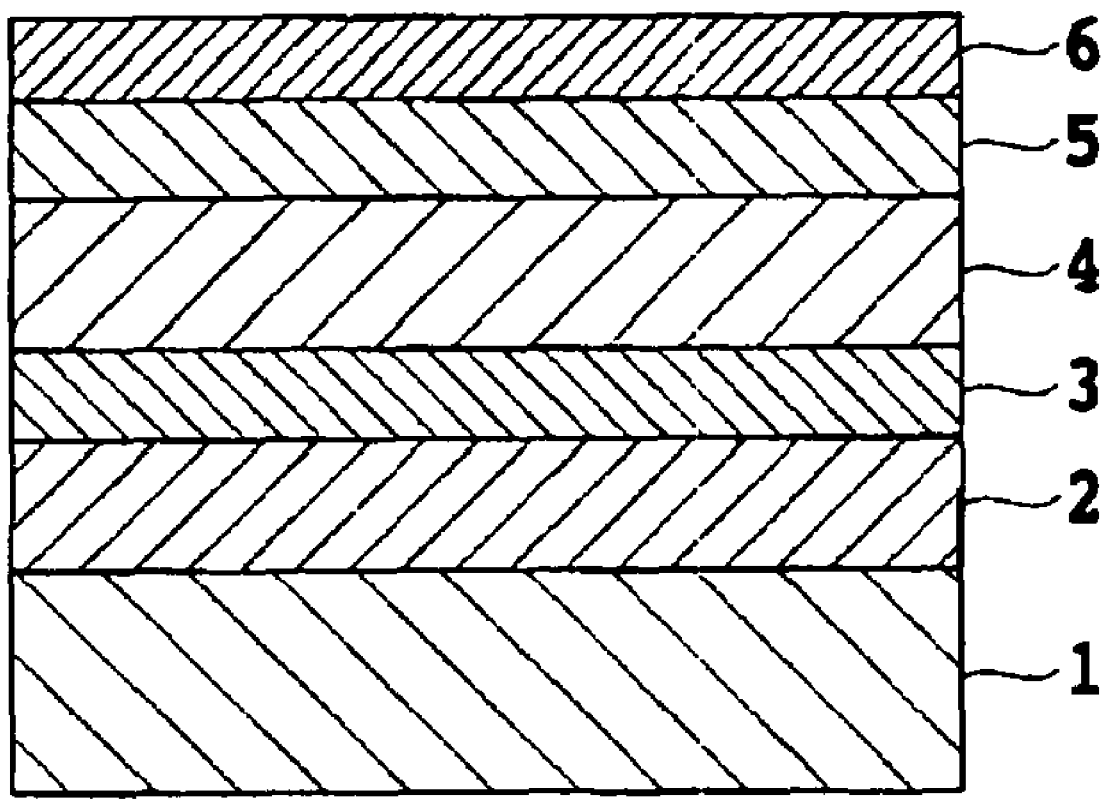
FIG. 1 is a schematic sectional drawing of a magnetic recording medium of the present invention.

FIG. 1 is a schematic sectional drawing of the magnetic recording medium of the present invention. This magnetic recording medium has a structure in which a nonmagnetic foundation layer 2, a nonmagnetic intermediate layer 3, a granular magnetic layer 4, and a protective layer 5 are formed in this order on a nonmagnetic substrate 1, and a liquid lubricant layer 6 is formed on the protective layer 5.

As the nonmagnetic substrate 1, a strengthened glass or an Al alloy plated with NiP, or a crystallized glass, or the like, as used with ordinary magnetic recording media can be used, or alternatively, because heating of the substrate is not necessary for reasons described later, a substrate made by injection molding a plastic resin such as a polycarbonate or a polyolefin can also be used.

The nonmagnetic foundation layer 2 is constituted from a nonmagnetic substance containing NiAl, Cr or the like that is preferentially oriented in the bcc (110) plane; it is preferable to use a metal such as Ta, Cr, W, Mo or V, a Cr alloy such as CrMo, CrTi, CrV or CrW, or a Ti alloy such as TiW, TiMo, TiCr or TiV containing 10 to 60 at % of Ti. In particular, to increase the effect of using the nonmagnetic intermediate layer 3 as described later, a TiW alloy or a TiMo alloy is preferable. Moreover, there are no particular limitations on the thickness of the foundation layer 2, but from the viewpoint of obtaining good recording/reproduction properties it is preferable to set this thickness to approximately 5 to 50 nm.

The granular magnetic layer 4 comprises ferromagnetic crystal grains having an hcp structure and nonmagnetic grain boundaries surrounding these ferromagnetic crystal grains; a metal oxide or nitride is present at these nonmagnetic grain boundaries, thus spatially separating the ferromagnetic crystal grains from one another. Such a granular structure can be obtained, for example, by carrying out film deposition by sputtering using as a target a ferromagnetic metal containing an oxide for forming the nonmagnetic grain boundaries, or carrying out film deposition by reactive sputtering using a ferromagnetic metal as a target in Ar gas containing oxygen.

There are no particular limitations on the material constituting the ferromagnetic crystal grains, but preferably a CoPt alloy is selected. In particular, from the viewpoint of reducing medium noise, it is preferable to add at least one element selected from the group consisting of Cr, Ni and Ta to the CoPt alloy.

Moreover, to form a stable granular structure, as the material constituting the nonmagnetic grain boundaries, at least one oxide of at least one element selected from the group consisting of Cr, Co, Si, Al, Ti, Ta, Hf and Zr is preferable. Furthermore, there are no particular limitations on the thickness of the magnetic layer, which should be set such that a sufficient head reproduction output can be obtained during recording/reproduction.

For the protective layer 5, for example a thin film comprising mainly carbon can be used. Moreover, for the liquid lubricant layer 6, for example a perfluoropolyether lubricant can be used.

The non magnetic intermediate layer 3 in the magnetic recording medium of the present invention must be made of an alloy (or metal) that has an hcp crystal structure and is preferentially oriented in the hcp (100) plane or the hcp (200) plane. Specifically, the nonmagnetic intermediate layer 3 is preferably made of (1) an alloy containing at least Ge and containing at least one selected from the group consisting of Fe and Mn, (2) an alloy containing at least Co and containing at least one selected from the group consisting of W and Mo, (3) an alloy containing at least Ti and containing at least one selected from the group consisting of Pd, Ga and Al, (4) an alloy containing at least Ni and containing at least one selected from the group consisting of Zr, Sn and In, (5) an alloy of Fe and Sn, (6) at least one compound selected from the group consisting of carbides and nitrides of Go, Ni and Fe, or (7) an alloy having an $Ni_3Sn$-type (DO19-type) or AuCd-type (B19-type) regular lattice structure.

It is thought that the reason that the magnetic properties are improved by providing such a nonmagnetic intermediate layer 3 is that, because a nonmagnetic intermediate layer 3 having an hcp structure is present in advance as a foundation for the deposition of the granular magnetic layer 4, epitaxial growth of ferromagnetic crystals in the granular magnetic layer 4, which has an hcp structure, is promoted, and hence there is an effect of the crystallinity of the magnetic layer being increased, and moreover the initial state of growth of the magnetic layer is favorably controlled. There are no particular limitations on the thickness of the nonmagnetic intermediate layer 3, but approximately 1 to 50 nm is suitable.

Moreover, to further increase the degree of epitaxial growth and thus obtain yet better magnetic properties, it is preferable to set the crystal lattice misfit amount between the nonmagnetic intermediate layer 3 and the granular magnetic layer 4 as follows. Taking the a-axis and c-axis lattice constants of the nonmagnetic intermediate layer 3 to be a and c respectively, and taking the a-axis and c-axis lattice constants of the granular magnetic layer 4 to be a' and c' respectively, in the case that the a-axis lattice constant a satisfies $a \leq 3$ Å, an A value is taken as a (A=a), whereas in the case that a>3 Å, the A value is taken as a/2 (A=a/2), and moreover in the case that the c-axis lattice constant c satisfies $c \leq 5$ Å, a C value is taken as c (C=c), whereas in the case that c>5 Å, the C value is taken as c/2 (C=c/2); based on these values, the misfit amount (%) in the a-axis direction is defined as $|(A-a')/A| \times 100$, and the misfit amount (%) in the c-axis direction is defined as $|(C-c')/C| \times 100$. Crystal design of the nonmagnetic intermediate layer 3 is then carried out such that each of these misfit amounts is not more than 10%.

When manufacturing such a magnetic recording medium as shown in FIG. 1, even if a substrate heating step, which is essential in a conventional magnetic recording medium manufacturing process, is omitted, an increase in Hc and a reduction in medium noise can be achieved, and hence accompanying the simplification of the manufacturing process, it becomes possible to reduce the manufacturing cost.

The present invention will now be described in more detail through examples.

Using an injection molded polycarbonate substrate (3.5" disk shape) as a nonmagnetic substrate 1, this was washed and then put into a sputtering apparatus, and then a foundation layer 2 of composition Cr-20 at % Mo was formed to a thickness of 15 nm under an Ar gas pressure of 5 mTorr. On the foundation layer 2 was deposited a nonmagnetic intermediate layer 3 having any of various compositions, in each case to a thickness of 30 nm under an Ar gas pressure of 5 mTorr.

Next, a granular magnetic layer 4 was deposited to a thickness of 20 nm by RF sputtering under an Ar gas pressure of 5 mTorr using a $CoCr_{12}Pt_{12}$ target to which 10 mol % of $SiO_2$ had been added, and then a carbon protective layer 5 was formed to a thickness of 10 nm, after which the magnetic recording medium was removed from the sputtering apparatus, and then a liquid lubricant layer 6 was applied on to a thickness of 1.5 nm, thus producing a magnetic recording medium having a structure as shown in FIG. 1. Substrate heating was not carried out before the deposition of the various films described above.

Moreover, for comparison, a magnetic recording medium having no nonmagnetic intermediate layer 3 (Comparative Example 1), and a magnetic recording medium having 70Ir30Cr, which is nonmagnetic and has an hcp structure, of thickness 20 nm as the nonmagnetic intermediate layer 3 (Comparative Example 2) were also produced.

Table 1 shows the composition and crystal structure of the nonmagnetic intermediate layer 3, and various magnetic properties, for each of the magnetic recording media.

TABLE 1

| | Intermediate layer composition | Crystal structure | Hc (Oe) | Brδ (Gμm) | Reproduction output (mVp-p) | Medium noise (μV) | SNR (dB) |
|---|---|---|---|---|---|---|---|
| Example 1 | 75Fe25Ge | hcp (D0_19) | 3345 | 4 | 0.98 | 20.7 | 27.48 |
| Example 2 | 75Co25W | hcp (D0_19) | 3411 | 45 | 1.018 | 21.38 | 27.53 |
| Example 3 | 75Ti25Pd | hcp (B19) | 3446 | 44 | 0.992 | 20.85 | 27.53 |
| Example 4 | 50Ni50In | hcp (D0_19) | 3346 | 38 | 0.965 | 18.85 | 27.21 |
| Example 5 | 75Fe25Sn | hcp (D0_19) | 3321 | 46 | 1.025 | 22.05 | 27.33 |
| Example 6 | 75N125N | hcp (D0_19) | 3102 | 43 | 0.952 | 21.32 | 26.98 |
| Example 7 | 66Fe34C | hcp (D0_19) | 3122 | 41 | 0.923 | 20.49 | 27.05 |
| Example 8 | 75Ti25Al | hcp (D0_19) | 3255 | 42 | 0.943 | 20.89 | 27.13 |
| Example 9 | 75In25Ni | hcp (D0_19) | 3255 | 42 | 0.943 | 20.89 | 27.13 |
| Comparative Example 1 | No intermediate layer | — | 1680 | 40 | 0.916 | 44.52 | 20.25 |
| Comparative Example 2 | 70Ir30Cr | hcp | 2765 | 42 | 0.932 | 25.81 | 24.13 |

Here, Hc is the coercivity, Brδ is the product of the film thickness and the residual magnetic flux density as measured using a VSM, and SNR is the signal-to-noise ratio. Moreover, the reproduction output is the reproduction output for an isolated reproduced waveform as measured with a spin stand tester using a GMR head, and the medium noise is the value measured at a linear recording density of 200 kFCI.

For the magnetic recording medium not having a nonmagnetic intermediate layer 3 (Comparative Example 1), Hc was 1680 Oe and the SNR was 20.25 dB, whereas for the magnetic recording medium having 20 nm of 70Ir30Cr, which is nonmagnetic and has an hcp structure (Comparative Example 2), Hc was approximately 1000 Oe higher than for Comparative Example 1 at 2765 Oe, and the SNR value was approximately 4 dB higher than for Comparative Example 1 at 24.13 dB.

Furthermore, for the magnetic recording media of the present invention having a nonmagnetic intermediate layer 3 having an hcp structure with a $D0_{19}$-type or B19-type regular lattice structure as the crystal structure (Examples 1 to 9), in each case a high Hc exceeding 3100 Oe and an SNR exceeding approximately 27 dB were obtained, i.e. an improvement in properties of approximately 500 Oe for Hc and approximately 3 dB for the SNR compared with a conventionally used Ir—Cr alloy or the like was found.

Table 2 shows, for each of the magnetic recording media of Examples 1 to 9, the composition of the nonmagnetic intermediate layer 3, and the results of calculating the misfit amount (%) between the lattice of the nonmagnetic intermediate layer 3 and the lattice of the granular magnetic layer 4 based on the a-axis and c-axis lattice constants (a and c) of the nonmagnetic intermediate layer 3.

Here, the original lattice constants of the nonmagnetic intermediate layer are larger than the lattice constants of the Co alloy granular magnetic layer; in the case that the a-axis lattice constant a satisfies a≦3 Å, the A value is taken as a (A=a), whereas in the case that a>3 Å, the A value is taken as a/2 (A=a/2); in the case that the c-axis lattice constant c satisfies c≦5 Å, the C value is taken as c (C=c), whereas in the case that c>5 Å, the C value is taken as c/2 (C=c/2).

Calculating C/A from the A value and C value determined in this way, it can be seen that for all of the magnetic recording media, C/A exhibited a value between 1.5 and 1.9, and moreover the lattice misfit amount with the granular magnetic layer was a very small value at not more than 10% for both of the a-axis and the c-axis.

Figure 2:
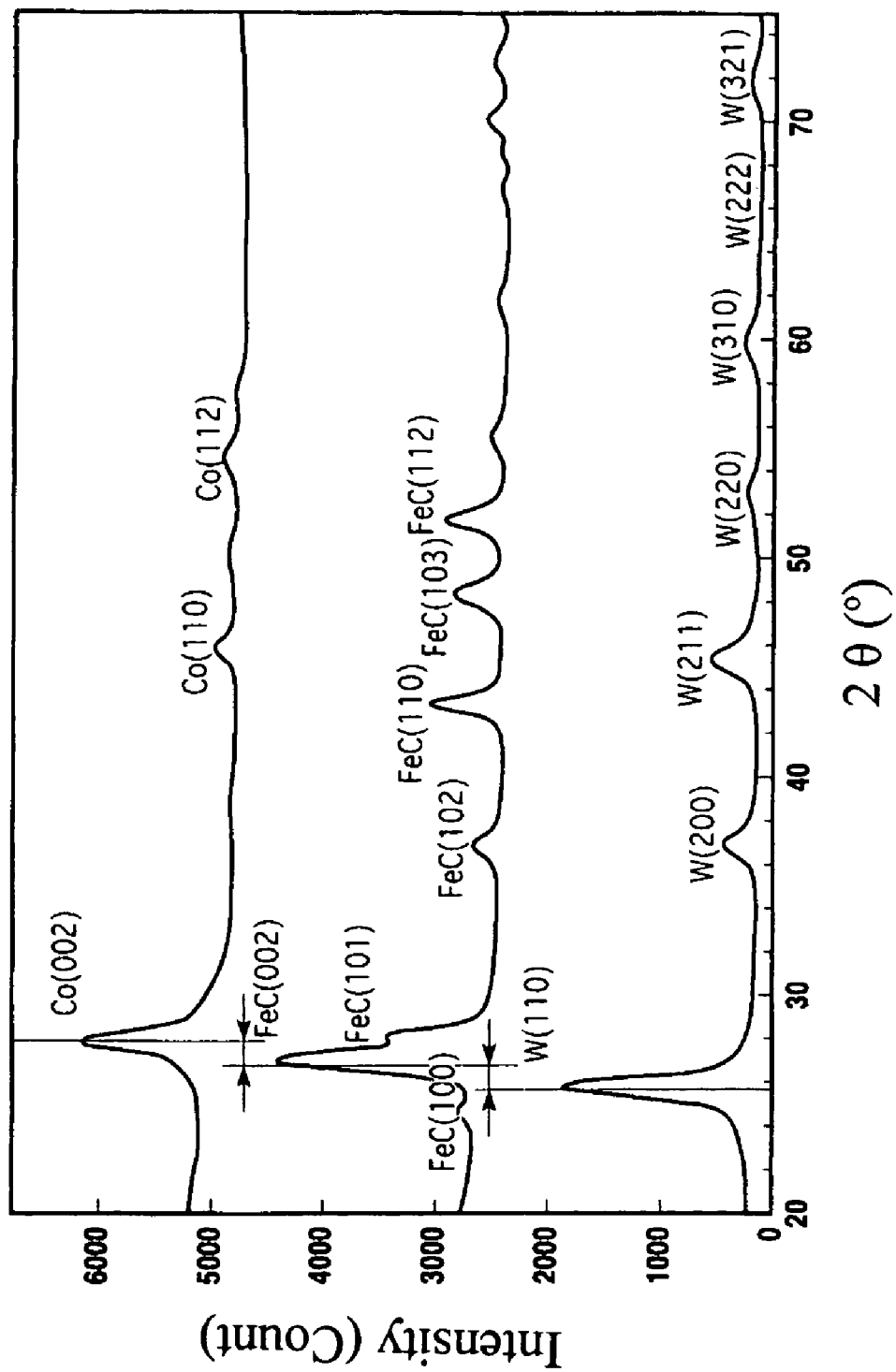
FIG. 2 is a diagram showing the X-ray in-plane diffraction patterns for a magnetic recording medium of the present invention having a W foundation layer and a 66Fe34C nonmagnetic intermediate layer.

FIG. 2 shows the X-ray in-plane diffraction patterns as measured using radiation for a magnetic recording medium of the present invention having a W foundation layer and a 66Fe34C nonmagnetic intermediate layer. From the diffraction patterns, it can be seen that a W bcc (110)/66Fe34C hcp (002)/magnetic layer Co alloy hcp (002) epitaxially grown layered structure has been formed. Note that the diffraction patterns were obtained by X-ray in-plane diffraction, and hence the hcp (002) plane corresponds to the hcp (100) plane in the conventional θ-2θ measurement method.

As described above, in the case of the magnetic recording medium of the present invention, the nonmagnetic foundation layer is made to have a body-centered cubic crystal structure with the preferred crystal orientation plane being the bcc (110) plane, and between this foundation layer and the granular magnetic layer there is provided a nonmagnetic intermediate layer that has a hexagonal close-packed structure with the hcp (100) plane or the hcp (200) being the

TABLE 2

| | Intermediate layer composition | Intermediate layer | | | | | Misfit (%) | |
|---|---|---|---|---|---|---|---|---|
| | | a(Å) | c(Å) | A(Å) | C(Å) | C/A | a-axis | c-axis |
| Example 1 | 75Fe25Ge | 5.02 | 8.16 | 2.51 | 4.08 | 1.63 | 2.4 | 2.2 |
| Example 2 | 75Co25W | 5.12 | 4.12 | 2.56 | 4.12 | 1.61 | 0.4 | 1.2 |
| Example 3 | 75Ti25Pd | 5.49 | 8.96 | 2.74 | 4.48 | 1.64 | 6.2 | 7.0 |
| Example 4 | 50Ni50In | 5.25 | 4.36 | 2.62 | 4.35 | 1.66 | 1.9 | 4.2 |
| Example 5 | 75Fe25Sn | 5.46 | 4.36 | 2.73 | 4.36 | 1.60 | 5.9 | 4.4 |
| Example 6 | 75N125N | 4.67 | 4.34 | 2.34 | 4.34 | 1.85 | 9.8 | 4.0 |
| Example 7 | 66Fe34C | 2.75 | 4.35 | 2.75 | 4.35 | 1.58 | 6.6 | 4.2 |
| Example 8 | 75Ti25Al | 5.71 | 4.62 | 2.86 | 4.62 | 1.62 | 10.0 | 9.8 |
| Example 9 | 75In25Ni | 5.47 | 4.19 | 2.74 | 4.19 | 1.53 | 6.1 | 0.6 | preferred orientation plane, and furthermore the crystal lattice misfit amount between the nonmagnetic intermediate layer and the granular magnetic layer is made to be not more than 10% for each of the a-axis and the c-axis. As a result, it becomes possible to form a nonmagnetic intermediate layer from a relatively inexpensive material and reduce the amount of Pt in the magnetic layer composition when simultaneously realizing an increase in coercivity and a reduction in noise, and hence a large reduction in cost is possible. Moreover, substrate heating is no longer necessary when manufacturing the magnetic recording medium of the present invention, and hence it also becomes possible to use an inexpensive plastic for the substrate.

In this way, according to the present invention, it becomes possible to provide a magnetic recording medium and a manufacturing method thereof, according to which an increase in coercivity and a reduction in noise are simultaneously realized, and moreover the manufacturing cost is reduced.

The invention has been described with reference to certain preferred embodiments thereof. It will be understood, however, that modifications and variations are possible within the scope of the appended claims.

What is claimed is:

1. A magnetic recording medium comprising:
   a nonmagnetic substrate;
   a nonmagnetic foundation layer formed over the nonmagnetic substrate, wherein said foundation layer has a body-centered cubic crystal structure with a preferred crystal orientation plane being a bcc (110) plane;
   a granular magnetic layer formed over the nonmagnetic foundation layer; and
   a protective layer formed over the granular magnetic layer;
   wherein a nonmagnetic intermediate layer, located between said foundation layer and said granular magnetic layer, has a hexagonal close-packed structure with either an hcp (100) plane or an hcp (200) plane.

2. A magnetic recording medium comprising:
   a nonmagnetic substrate;
   a nonmagnetic foundation layer formed over the nonmagnetic substrate, wherein said foundation layer has a body-centered cubic crystal structure with a preferred crystal orientation plane being a bcc (110) plane;
   a granular magnetic layer formed over the nonmagnetic foundation layer; and
   a protective layer formed over the granular magnetic layer;
   wherein a nonmagnetic intermediate layer, located between said foundation layer and said granular magnetic layer, has a hexagonal close-packed structure with an hcp (100) plane or an hcp (200) plane being a preferred orientation plane,
   wherein said nonmagnetic intermediate layer comprises an alloy including at least Ge and at least one selected from the group consisting of Fe and Mn.

3. The magnetic recording medium according to claim 1 wherein said nonmagnetic intermediate layer comprises an alloy including at least Co and at least one selected from the group consisting of W and Mo.

4. The magnetic recording medium according to claim 1, wherein said nonmagnetic intermediate layer comprises an alloy including at least Ti and at least one selected from the group consisting of Pd, Ga and AJ.

5. The magnetic recording medium according to claim 1 ,wherein said nonmagnetic intermediate layer comprises an alloy including at least Ni and at least one selected from the group consisting of Zr, Sn and In.

6. A magnetic recording medium comprising:
   a nonmagnetic substrate;
   a nonmagnetic foundation layer formed over the nonmagnetic substrate, wherein said foundation layer or has a body-centered cubic crystal structure with a preferred orientation plane being a bcc (110) plane;
   a granular magnetic layer formed over the nonmagnetic foundation layer; and
   a protective layer formed over the granular magnetic layer;
   wherein a nonmagnetic intermediate layer, located between said foundation layer and said granular magnetic layer, has a hexagonal close-packed structure with an hcp (100) plane or an hcp (200) plane being a preferred orientation plane,
   wherein said nonmagnetic intermediate layer comprises an alloy of Fe and Sn.

7. The magnetic recording medium according to claim 1, wherein said nonmagnetic intermediate layer comprises a compound containing at least one selected from the group consisting of carbides and nitrides of Co. Ni and Fe.

8. The magnetic recording medium according to claim 1, wherein said nonmagnetic intermediate layer comprises an alloy including a B19 or DO19 regular lattice structure.

9. The magnetic recording medium according to claim 1, wherein a crystal lattice misfit amount between said nonmagnetic intermediate layer and said granular magnetic layer is not more than 10% for each of an a-axis and a c-axis.

10. The magnetic recording medium according to claim 1, wherein nonmagnetic grain boundaries in said granular magnetic layer comprise at least one oxide of at least one element selected from the group consisting of Cr, Co, Si, Al, Ti, Ta, Hf and Zr.

11. The magnetic recording medium according to claim 1, wherein ferromagnetic crystals in said granular magnetic layer comprise a CoPt alloy; and wherein the CoPt alloy has at least one element selected from the group consisting of Cr, Ni and Ta added thereto.

12. The magnetic recording medium according to claim 1, wherein said foundation layer is a material selected from the group consisting of Ta, Cr, W, MoV, CrMo, CrTi, CrV, CrW, TiW containing 10 to 60 at % of Ti, TiMo containing 10 to 60 at % of Ti, TiCr containing 10 to 60 at % of Ti and TiV containing 10 to 60 at % of Ti.

13. The magnetic recording medium according to claim 1, wherein said nonmagnetic substrate comprises a plastic resin.

14. The magnetic recording medium according to claim 1, further comprising a liquid lubricant layer formed over the protective layer.

15. A method of manufacturing a magnetic recording medium comprising:
   depositing a nonmagnetic foundation layer on an unheated nonmagnetic substrate, wherein said foundation layer has a body-centered cubic crystal structure with a preferred crystal orientation plane being a bcc (110) plane;
   depositing a nonmagnetic intermediate layer over said nonmagnetic foundation layer, wherein said nonmagnetic intermediate layer has a hexagonal close-packed structure with either an hcp (100) plane or an hcp (200) plane;

depositing a granular magnetic layer over the nonmagnetic intermediate layer; and depositing a protective layer over the granular magnetic layer.

16. The method according to claim 15, wherein said nonmagnetic intermediate layer comprises an alloy including at least Ge and at least one selected from the group consisting of Fe and Mn.

17. The method according to claim 15, wherein said nonmagnetic intermediate layer comprises an alloy including at least Co and at least one selected from the group consisting of W and Mo.

18. The method according to claim 15, wherein said nonmagnetic intermediate layer comprises an alloy including at least Ti and at least one selected from the group consisting of Pd, Ga and Al.

19. The method according to claim 15, wherein said nonmagnetic intermediate layer comprises an alloy including at least Ni and at least one selected from the group consisting of Zr, Sn and in.

20. The method according to claim 15, wherein said nonmagnetic intermediate layer comprises an alloy of Fe and Sn.

21. The method according to claim 15, wherein said nonmagnetic intermediate layer comprises a compound containing at least one selected from the group consisting of carbides and nitrides of Co, Ni and Fe.

22. The method according to claim 15, wherein said nonmagnetic intermediate layer comprises an alloy including a B19 or DO19 regular lattice structure.

23. The method according to claim 15, wherein a crystal lattice misfit amount between said nonmagnetic intermediate layer and said granular magnetic layer is not more than 10% for each of an a-axis and a c-axis.

24. The method according to claim 15, wherein nonmagnetic grain boundaries in said granular magnetic layer comprise at least one oxide of at least one element selected from the group consisting of Cr, Co, Si, Al, Ti, Ta, Hf and Zr.

25. The method according to claim 15, wherein ferromagnetic crystals in said granular magnetic layer comprise a CoPt alloy; and wherein the CoPt alloy has at least one element selected from the group consisting of Cr, Ni and Ta added thereto.

26. The method according to claim 15, wherein said foundation layer is a material selected from the group consisting of Ta, Cr, W, MoV, CrMo, CrTi, CrV, CrW, TiW containing 10 to 60 at % of Ti, TiMo containing 10 to 60 at % of Ti, TiCr containing 10 to 60 at % of Ti and TiV containing 10 to 60 at % of Ti.

27. The method according to claim 15, wherein said nonmagnetic substrate comprises a plastic resin.

28. The method according to claim 15, further comprising coating a liquid lubricant layer over the protective layer.

* * * * *

UNITED STATES PATENT AND TRADEMARK OFFICE
CERTIFICATE OF CORRECTION

PATENT NO.         : 7,183,013 B2                                        Page 1 of 1
APPLICATION NO. : 10/764813
DATED              : February 27, 2007
INVENTOR(S)        : Tadaaki Oikawa et al.

It is certified that error appears in the above-identified patent and that said Letters Patent is hereby corrected as shown below:

In Claim 4, Column (9), Row (64) "Pd, Ga and AJ", is incorrect and should read as follows: "Pd, Ga and Al"

In Claim 7, Column (10), Row (23) "Co. Ni and Fe", is incorrect and should read as follows: "Co, Ni and Fe"

In Claim 12, Column (10), Row (43) "W, MoV, CrMo", is incorrect and should read as follows: "W, Mo, V, CrMo"

In Claim 19, Column (11), Row (20) "Zr, Sn and in", is incorrect and should read as follows: "Zr, Sn and In"

In Claim 26, Column (12), Row (19) "W, MoV, CrMo", is incorrect and should read as follows: "W, Mo, V, CrMo"

Signed and Sealed this

First Day of May, 2007

JON W. DUDAS
*Director of the United States Patent and Trademark Office*